United States Patent [19]

Hoppe et al.

[11] Patent Number: 5,421,949
[45] Date of Patent: Jun. 6, 1995

[54] APPARATUS FOR APPLYING SIGNATURE STRIPES TO IDENTITY CARDS

[75] Inventors: Joachim Hoppe; Yahya Haghiri-Tehrani; Eugen Neumann, all of Munich, Germany

[73] Assignee: GAO Gesellschaft fur Automation und Organisation GmbH, Germany

[21] Appl. No.: 86,914

[22] Filed: Jul. 7, 1993

Related U.S. Application Data

[62] Division of Ser. No. 513,000, Apr. 23, 1990, Pat. No. 5,252,167.

[30] Foreign Application Priority Data

Apr. 25, 1989 [DE] Germany ............... 39 13 604.3

[51] Int. Cl.⁶ ............................................ B32B 31/18
[52] U.S. Cl. ............................ 210/520; 156/530; 156/538; 156/261; 156/264
[58] Field of Search ............. 156/497, 518, 517, 519, 156/520, 580.1, 580.2, 536, 530, 264, 261

[56] References Cited

U.S. PATENT DOCUMENTS

| | | |
|---|---|---|
| 3,224,917 | 12/1965 | Langan . |
| 3,616,084 | 10/1971 | Rogers . |
| 3,651,312 | 3/1972 | Barney . |
| 3,874,963 | 4/1975 | Barger . |
| 3,902,955 | 9/1975 | West . |
| 4,149,925 | 4/1979 | Mintz . |
| 4,325,196 | 4/1982 | Gauch et al. . |
| 4,424,093 | 1/1984 | Schubert ............... 156/497 |
| 4,832,776 | 5/1989 | Pace . |
| 4,959,115 | 9/1990 | Lacy ..................... 156/264 |

*Primary Examiner*—Robert A. Dawson
*Assistant Examiner*—David Reifsnyder
*Attorney, Agent, or Firm*—Bacon & Thomas

[57] ABSTRACT

The invention relates to a method and an apparatus for applying flat punched elements in the desired position to the surface of a carrier material, the elements being present in multiple copies on a sheet. The multiple copies are fed to an applying device and positioned therein. At the same time as individual elements are separated out or punched, these elements are fixed in position with respect to the carrier material.

6 Claims, 8 Drawing Sheets

APPARATUS FOR APPLYING SIGNATURE STRIPES TO IDENTITY CARDS

This application is a division of application Ser. No. 07/513,000, filed Apr. 23, 1990, now U.S. Pat. No. 5,252,167.

BACKGROUND OF THE INVENTION

The present invention relates to a method for applying flat punched elements to the surface of a carrier material, in particular signature stripes made of paper to the cover films of cards, the elements being present in multiple copies on a sheet.

Due to their high protection from forgery, identity cards and entitlement cards are preferred in which the data to be protected from manipulation are applied to a "card inlay" laminated between two transparent cover films. To increase its protection from forgery, the card inlay bears a high-security print and other authenticity features such as watermarks, security threads, etc.

The cards are produced by known methods predominantly in a sheet form. For financial reasons one uses sheets which are as large as possible and divided into a plurality of individual card-sized copies. The arrangement of the copies is preferably identical on all sheets. The sheets of paper and plastic required for the subsequent card compound are prepared separately and superimposed in exact register prior to the lamination process. If possible, this process is performed automatically using sheet feeders or similar machines. The layers of paper and plastic are bonded together in a usual laminating press by the action of pressure and heat. The individual cards are thereafter punched out of the sheet material.

The individual card often has one or more layers covering only part of the total card surface. A typical example of this is a signature stripe extending across the card surface as a strip of paper about one centimeter wide. As only part of the surface is covered, the areas nor required are punched out of the corresponding sheet and removed. To prevent the sheet from disintegrating completely into single elements during punching, the punching pattern is such that the elements remain interconnected by bridges. As a result one obtains a "grid sheet".

However, the punched openings have the unpleasant property of reducing the inherent stability of the sheet. The smaller the basis weight and the larger the sheet, the greater is the reduction of stability. Due to the low inherent stability, the grid sheet tends to warp or tear during handling and transport. A large punched surface increases the problems of handling the grid sheet, so that it can finally only be processed into a card compound by difficult manual work. This is particularly disadvantageous in the production of large piece numbers, since the processing of the grid sheets is a bottleneck in the production process that can hardly be economized.

Furthermore, grid sheets can always be used only when the individual elements extend at least to one edge of the card. It is not possible to use grid sheets to produce cards with "edgeless" elements located like islands on the card surface with no connection to the edge.

The invention is based on the problem of stating an automatic, and thus efficient, method making it possible to apply flat elements to the surface of a carrier material precisely, and without error. The method and apparatus are also intended to be capable of integration in the existing production equipment that is found in printing companies.

A further problem is to design the automatic method in such a way that it is suitable for applying both edgeless and "edge-touching" elements.

BRIEF SUMMARY OF THE INVENTION

These problems are solved by the present invention as described herein.

The essence of the invention is that during the punching process the elements are fixed in a predetermined position, and this fixing is only ended after the individual elements have been permanently bonded with a carrier material in exact register. Departing from the classical label punching method, the carrier (card film) is not included in the punching process according to the invention, so that it remains fully intact. The punched elements are thus always associated with the carrier (card film) after the punching process.

The invention is specifically divided into the following method steps:
- feeding the multiple copies to a punching device and positioning them in the punch bed,
- punching the elements and fixing their position.
- feeding a carrier material and aligning it with the fixed elements.
- bonding the elements with the carrier, and
- removing the compound material.

Depending on the forms of material and types of machine used, the inventive method can be divided into a number of variations, three of which are described below.

VARIATION I

The essential feature of the first variation is that the method steps of punching, fixing and bonding are performed in one specially designed bed. The material to be punched, which may be present in the form of rolls or sheets, is fed to the bed of a punching device and positioned there. According to the invention, the elements are held in the punch bed in their original arrangement during the punching process. This can be done, for example, by equipping the punch bed with a vacuum suction means for sucking the elements, or contouring the punch bed in accordance with the position and extent of the elements. After punching has been performed and the waste disposed of, a carrier material is fed to the punch bed and aligned with the punched elements in exact register for bonding. After a permanent bond has been established between the materials by suitable bonding techniques, the fixing is ended: the finished compound sheet can now be removed automatically for processing.

VARIATION II

The feature of the second variation is that the elements are transferred to another bed after punching for the subsequent method steps. Special handling devices ensure that they are deposited on the second bed in the proper position. The advantage is that the register pattern of the punching material need not be identical to the register of the carrier material. It is preferably such that, the elements are disposed as close together as possible, so that the waste is minimal.

To perform the method, one punches the elements out of their sheet singly or in small groups in a punching device, and fixes them in their original position relative to the punch bed. The elements and carrier material are brought together register in an intermediate step using manipulators. The latter bring the carrier and the elements together using position control means in such a way that they are thereafter superimposed in exact register. After the materials have been bonded together the compound material can be removed and processed further.

VARIATION III

This variation involves performing the method on a modified roller type punching machine that includes various material feeding and delivering means and a device for bonding the materials. The use of roller type machines makes the method particularly suitable for processing webs of material. The carrier and the punching material are printed in an identical arrangement of the copies. The printed pattern of the punching material is preferably such that the waste forms an interconnected grid web. The punching material is supplied in exact register to the punching device comprising a cutter roller and a back pressure roller. After punching the waste is removed in the form of an interconnected grid web while the elements fixed to the back pressure roller run toward the bonding device. Here, the carrier material is placed on the elements in exact register and bonded therewith. The fixing is thereafter ended and the compound web removed from the punching device.

The three variations described have presented basic embodiments of the method which include a great number of concrete examples. Nevertheless, this division into three forms does not claim to be complete. The stated method steps put an expert in a position to select mixed forms or other variations based on the inventive method and also utilizing its advantages.

The description of the variations already suggests that the method is largely independent of the type of punching machine used: it may be performed on a flat bed punch, on a roller type punch or on mixed forms of roller type and flat bed machines. The only essential point is that the punched elements can be fixed in position.

To fix the elements on the punch bed, there are various methods available. A method already mentioned is vacuum fixing. The punch bed has a plurality of channels corresponding to the arrangement of the elements on their sheet and extending under the punching material. A vacuum sucks the elements and holds each one separately on the punch bed.

Another fixing method is to provide the punch bed with contours or openings for holding or guiding the punched elements. It is particularly advantageous to divide the punch bed into two components, a perforated back pressure plate for receiving the punching material and a bonding table disposed therebelow into which the carrier material is inserted. The openings in the back pressure plate correspond in their position and shape to the arrangement of the elements on the punching material and extend as far as the bonding table. During punching a push-through die cuts out the elements and presses them through the openings, which at the same time guide the elements in the proper position, to the carrier material where the bond is established.

Depending on the material and production technology, the carrier and the elements can be bonded together in various ways. If the elements are made of paper and the carrier of a thermoplastic synthetic material, "thermofixing" is advantageous. The carrier is heated briefly above its solid point and contacted with the paper layer. The plastic material penetrates the paper fabric and the synthetic material solidifies again during cooling, bonding the paper strip to the carrier.

There are various possibilities of heating the carrier, such as heating the push-through die, pressing hot needles on or through it, etc. The carrier is preferably heated only at certain points, thereby preventing it from warping or flowing over a large surface.

An advantageous bonding technique is to use materials provided with a thermally activated adhesive layer (a "heat-set adhesive layer"). This material can be fed to the processing units in a cold state like normal paper or film. Only when the elements and the carrier are superimposed in register, the materials are bonded by heating.

Classical bonding techniques can of course also be used, applying an adhesive to the carrier and/or the elements in an intermediate step for bonding the parts.

It is particularly advantageous to use an "ultrasonic welding set" within the framework of the invention to bond the positioned elements with the carrier.

With all bonding techniques, one must make sure that the elements adhere firmly enough to the carrier material at the time the position fixing is released.

An essential advantage of the new method is that it makes it unnecessary to handle a grid sheet or individual elements separately, which takes care of considerable problems of production technology. Independently of the size and shape of the punched elements, all method steps can be performed automatically. It is thus possible to set up a fully automatic production line to avoid bottlenecks, including printing, joining, laminating and punching out the cards.

A further advantage of the new method is that additional working steps can be readily incorporated into it. Thus, any number of further steps can be added between punching and bonding, provided the position fixing of the elements is maintained. Such additional working steps may be, for example, to apply an adhesive layer to the elements, print on markings, etc.

In the known method, the accuracy with which the elements are placed on the card surface is determined by how accurately the unstable grid sheet can be aligned with the other layers. Due to the problematic handling of the grid sheet, the tolerances are in the range of a few millimeters. In the inventive method, however, the placement tolerances are predetermined by the maintenance of the register position on the materials and by the positioning accuracy of the machines. Both the printing and the machine tolerances are usually only a few tenths of a millimeter, without any great efforts. With approximately the same accuracy, the elements are placed on a card completed by the new method. This results in a uniform appearance of the cards.

Since grid sheets must be used in the known methods, they can be used only for producing cards with edge-touching elements, which restricts the design of the card. The inventive method, however, considerably extends the possibilities of design, since it is unnecessary to provide bridges between the elements. An appropriate geometric design of the fixing device makes it possible to hold elements on the punch bed which are not connected to their neighbors. One is thus able to apply edgeless elements to the card as well. The card design is therefore more independent of the production technology and can be oriented toward expedient or esthetic aspects.

The inventive method has the advantage of being flexibly adaptable to the surrounding production technology; there is a great range of variation in the selection, grouping and addition of machines and production steps. The user is thus in a position to set up his own optimum production sequence.

When the method is used to place signature stripes on identity cards, the punched out elements are usually applied to the surface of cards, being embedded in the thermoplastic cover film under the effect of heat and pressure. This may involve problems in so far as the embedding of the signature stripe displaces card material. This may distort the printed pattern or result in breaking points at the edges of the embedding. These problems can be avoided by additionally applying to the surface a compensating film that has a recess in the shape of an element and the thickness of the element. The inventive method makes it possible to punch recesses out of a thickness compensating sheet while punching the elements in one working step. Since both materials (the sheet of elements and the compensating sheet) are punched in one step with the same tool, the recesses automatically formfit the elements and are in register therewith. Using this variation of the method one can produce cards having a smooth surface without steps, avoiding the aforesaid disadvantages.

Along with the aforesaid procedure, the inventive method may also be used to apply flat punched elements, for example signature stripes, to cards or similar carriers that have already been laminated. This procedure has the advantage that the aforesaid problems connected with the displacement of carrier material do not arise. On the other hand, a consequence of this procedure is that the signature stripe lies on the surface of the card with a clear difference in thickness, which causes the edges of the paper stripe to be damaged during daily handling and leads to disturbances in many automated uses.

To solve this problem it is proposed that the paper stripe be embedded in the card material so as to give rise to a soft transition between the surface of the paper and the surface of the card. For embedding one preferably uses a die, for example an ultrasonic die, having the contour of the paper stripe. The card material softening under the action of the ultrasonics is displaced by the die pressure out of the area below the signature stripe, and channeled by suitable mold elements in the environment of the die so as to give rise to a thickening of material in the marginal zones of the signature stripe, thereby creating a soft transition from the signature stripe to the card surface.

In Variations I, II and III mentioned above, the elements, for example signature stripes, are taken out of web or sheet material in a punching device in which they are also positioned.

According to a different method, which also solves the problem which the invention is based, the web or sheet material is prepunched such a way that the elements are connected with the sheet material by narrow bridges. In the device for applying the elements to the carrier material, the elements are then merely taken out of the sheet and transferred to the carrier material in exact register as in the methods described. In this procedure the punching process, which may be troublesome in particular if the sheet material is very thin, may be performed in special high-quality punching devices independently of the device for applying the elements to a carrier material.

DESCRIPTION OF THE DRAWINGS

Further advantages result from the exemplary embodiments described with reference to the figures, in which.

DETAILED DESCRIPTION OF THE PREFERRED EMBODIMENTS

Figure 1:
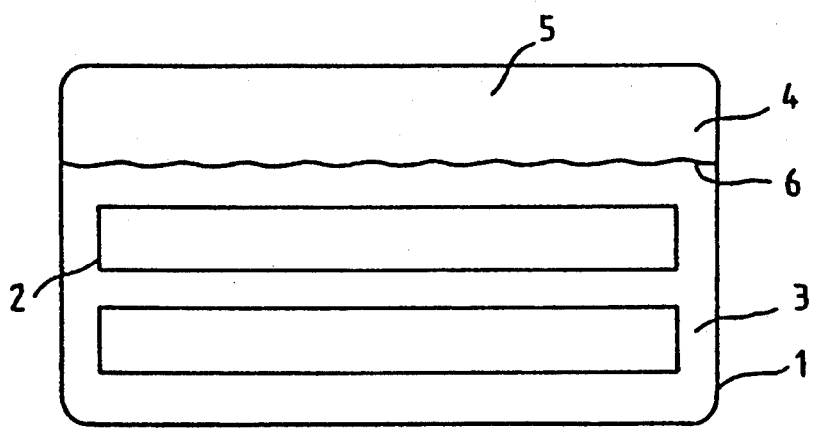
FIG. 1 shows an identity card with an edge-touching signature stripe applied on the edge.

FIG. 1 shows an example of an identity card 1 with the card inlay laminated between two transparent cover layers. The inlay bears not only standard data 2 but also a set of individual data 3 which are protected from manipulation by the cover layers. Individual element 4 is applied as a signature stripe on which the card owner provides his signature 5. Signature stripe 4 is applied at the upper edge, extending along a longitudinal edge which is utilized to form a grid. The signature stripe has an individual wavy cut 6 which obstructs unauthorized transfer of the stripe to another card.

Figure 2:
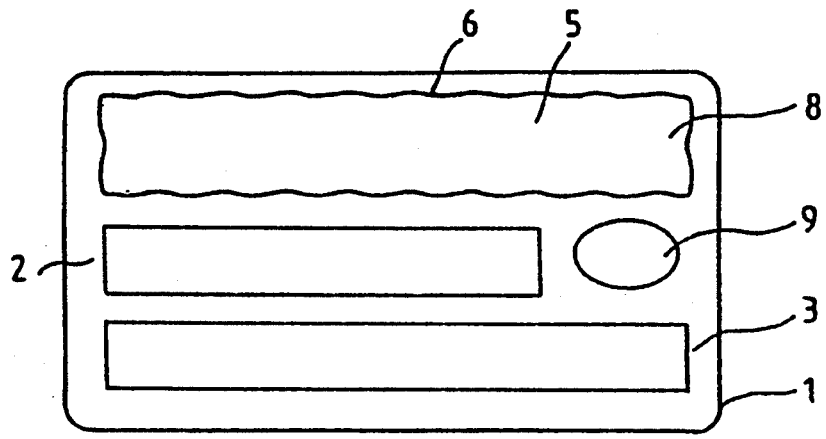
FIG. 2 shows an identity card with edgeless elements.

FIG. 2 shows, as another example, card 1 having two edgeless elements 8 and 9. Element 8 is formed as a signature stripe made of paper, element 9 is for example a logo or a security feature such as a hologram.

Figure 3:
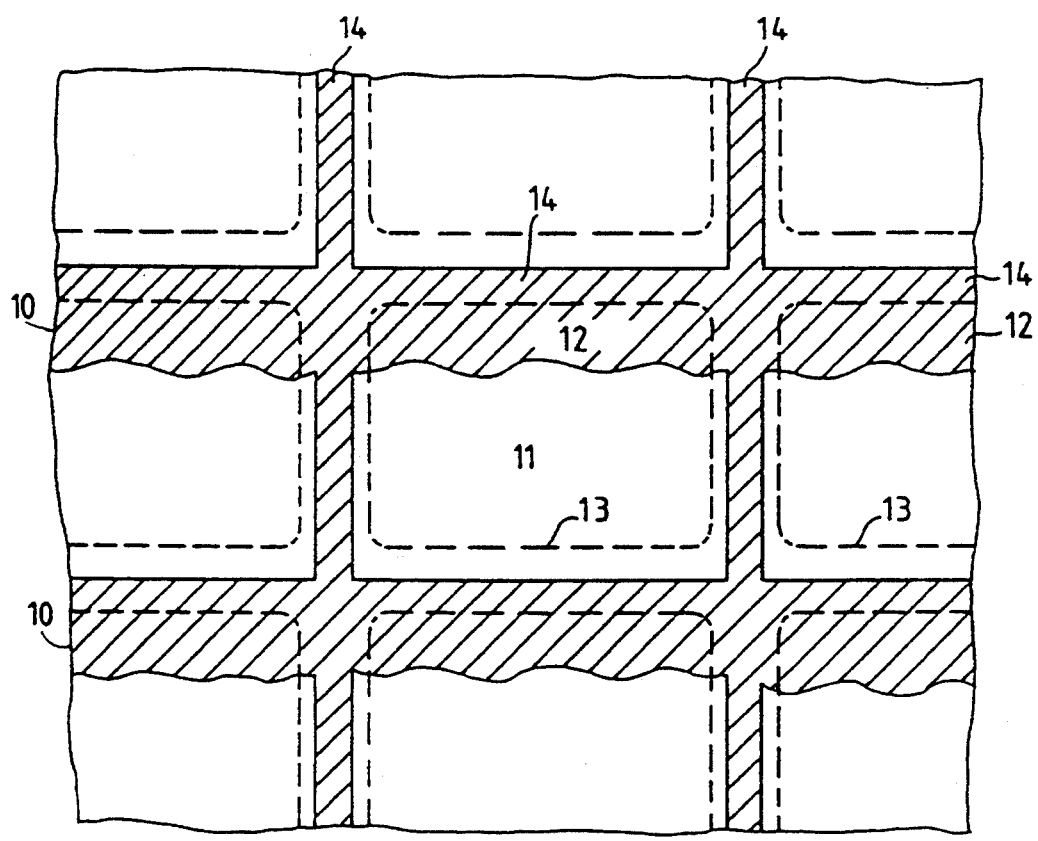
FIG. 3 shows a grid sheet as is used to produce cards with edge-touching elements.

FIG. 3 shows a portion of a grid sheet 10 as is used in the prior art to produce cards with edge-touching elements as in FIG. 1. Sheet 10 bears an arrangement of copies that is identical with the other layers of the card compound. Those areas 11 are punched out of the sheet which remain free on the subsequent card. The edge position of the element makes it possible to design the punching pattern in such a way that elements 12 remain interconnected via bridges 14. To produce the card, the grid sheet and the other sheets such as cover films, inlay, etc., are superimposed in exact register and fed to a laminating press, where they are bonded together under pressure and heat. The individual card is obtained by punching the compound sheet along card periphery 18.

Embodiments of variation I are shown in FIGS. 4 to 7.

Figure 4:
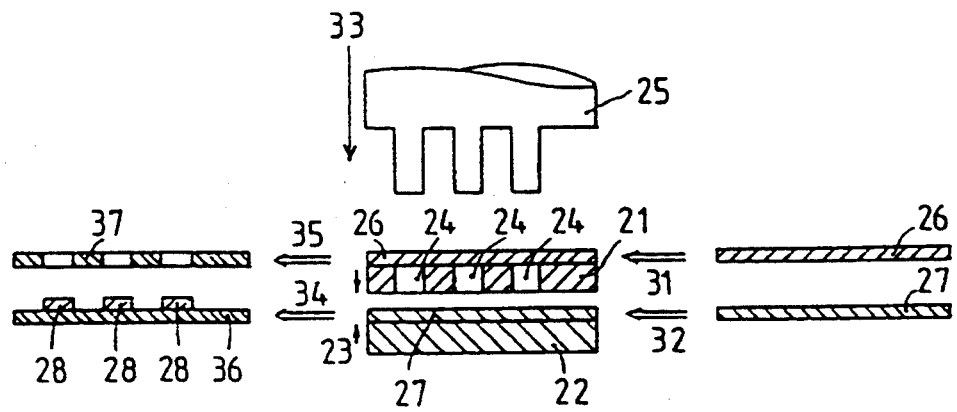
FIG. 4 shows a schematic top view of the process sequence using a push-through die.

As a first embodiment of the inventive method. FIG. 4 shows a solution which uses a flat bed punch. The special design of die 25 and punch bed 21, 22 makes it possible to cut, position and bond the elements with a carrier material in one working cycle. The described arrangement is particularly suitable for pairs of materials which can be bonded by pressure and/or temperature.

The punch bed is bipartite in this case, comprising a back pressure plate 21 and a bonding table 22. The two parts are disposed one above the other, free space 28 between table 22 and plate 21 being preferably in the millimeter range and such that sheets of material can be readily inserted and removed. Back pressure plate 21, onto which punching material 26 is inserted, has openings 24 corresponding in number, position and extent to elements 28 on the sheet. The bonding table, into which the carrier material is inserted, serves as a support during the bonding of the materials. Push-through die 25 is produced in register with openings 24 and serves to punch out elements 28. Additionally, die 25 is equipped with apparatus (not shown) such as an electric resistance heating means and can thus be used also for thermofixing elements 28 on carrier 27.

Figure 5:
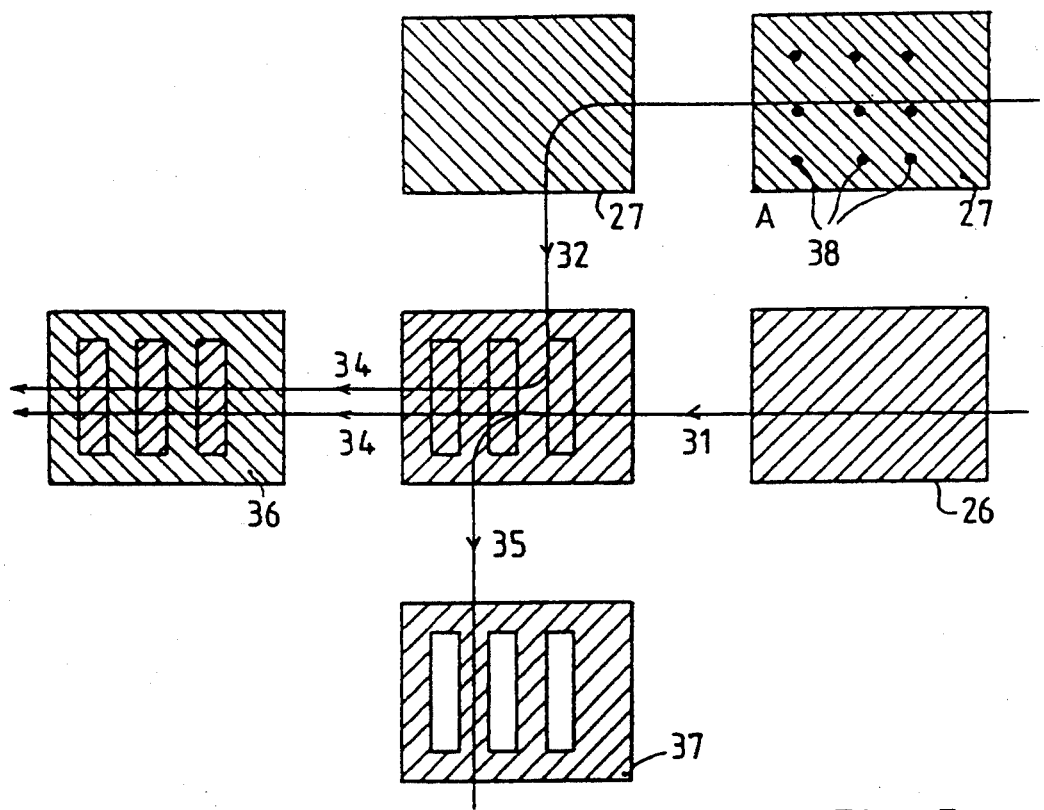
FIG. 5 shows a schematic upright projection of a punching device with a push-through die.

To make the process sequence clear, the flow of material and the method steps are marked with arrows in FIGS. 4 and 5. At the beginning of the process, punching material 26 and carrier material 27 are inserted into the bipartite punch bed using two sheet feeders (not shown) (arrows 31 and 32). Positioning means (not shown) such as locating stops or other means known in printing technology ensure that the two sheets 26 and 27 are aligned in exact register. Push-through die 25 is in its upper position above back pressure plate 21 during insertion. After sheets 26, 27 are aligned, the die moves toward back pressure plate 21 (arrow 33), punches elements 28 out of sheet 26 and presses them through openings 24 onto carrier material 27. Elements 28 are guided by the contour of the openings and are thus deposited on carrier 27 in a predefined position. In its lower position heatable die 25 rests on the punching material for a certain time period; under the pressure and heat of die 25 carrier sheet 27 bonds with elements 28. The height and time curve of the temperature and the dwell time of the die are adjusted so as to ensure a sufficient bond of the materials. After the die is withdrawn, pile delivery means (not shown) remove compound sheet 36 and waste 37 (arrows 34 and 35).

The presented solution can of course also be used in conjunction with other bonding techniques. For example, substances 38, such as a bonding agent, a primer, an adhesive, etc., can be applied in an additional unit A before the sheets are fed. Depending on the adhesive, the pressure of the die on the elements suffices to bond them with the carrier.

Figure 7:
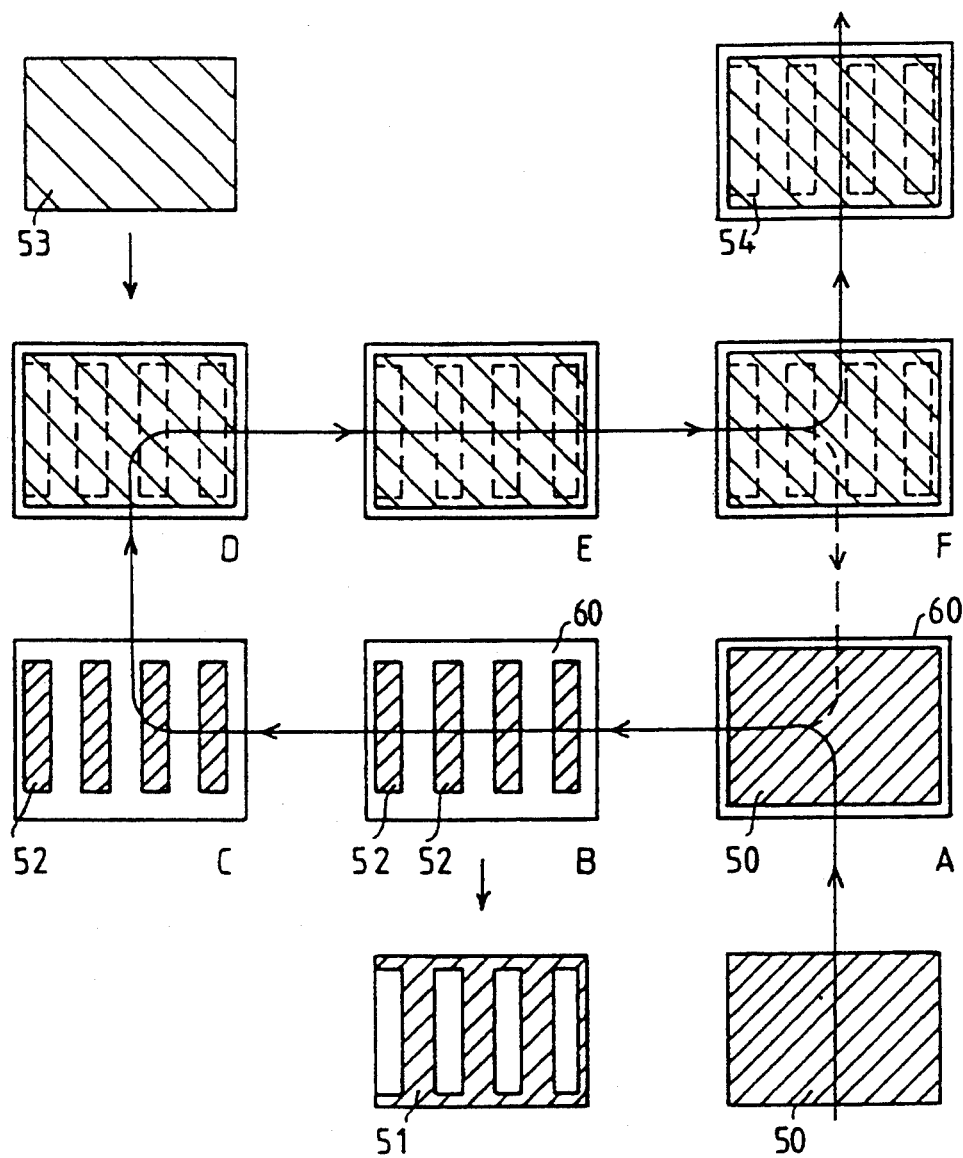
FIG. 7 shows a schematic view of the process sequence using a circulating punch bed.
Figure 8:
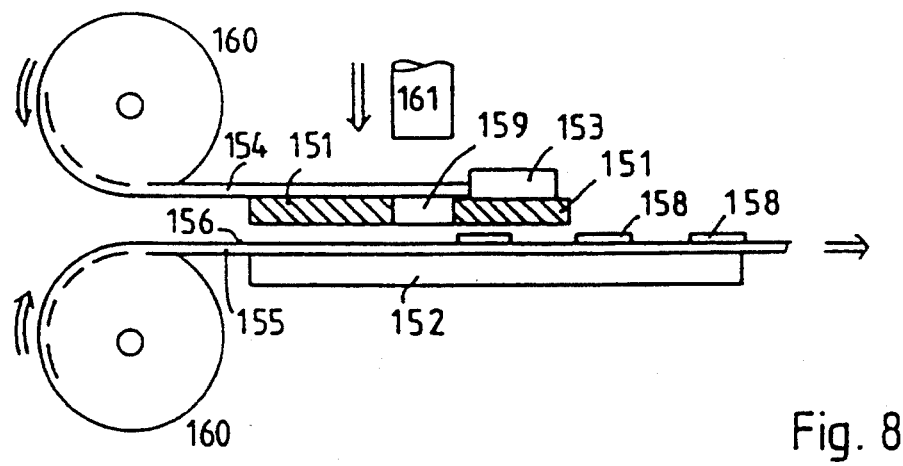
FIG. 8 shows a schematic view of an apparatus for punching and bonding web material on a flat bed punch.

In a second embodiment of variation I, shown in FIGS. 7 and 8, the punch bed is formed as a displaceable slide which transports the punching material to the various processing units. The fixing, which is effected by a vacuum suction means, is permanently maintained, if necessary.

Figure 6:
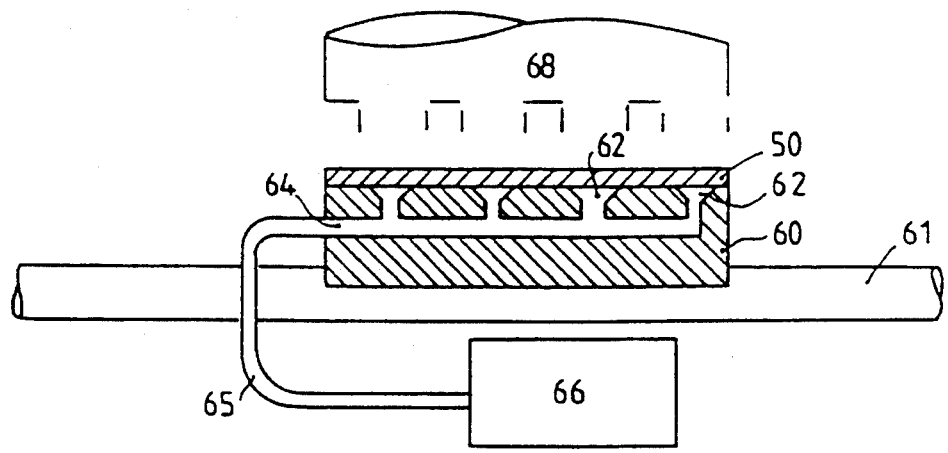
FIG. 6 shows a schematic view of a punch bed with a vacuum fixing means.

FIG. 6 shows a schematic view of a punch bed 60 equipped with a vacuum suction means. The bed is displaceable on longitudinal guideways 61 between the various units and can be stopped therein in predetermined positions. To fix the elements in a predeterminal position, bed 60 has a number of suction openings 62, their arrangement corresponding to the positions of the punched elements on punching material 50. Under each element there is at least one suction opening 62. Suction openings 62, which are connected with a vacuum system 66 via channels 64 and flexible tubing 65, are activated at the onset of the punching process. The resulting vacuum sucks inserted punching material 50 and holds initially the sheet, and later individual elements 28 in their original position of rest even after die 68 has been withdrawn.

The process sequence using the displaceable punch bed is shown schematically in FIG. 7. The path of the punch bed and the flow of material are symbolized by arrows. At the beginning of the process cycle, punch bed 60 shown in FIG. 6 is located in place J on a punching device.

When die 68 is in its upper position, punching material 50 is inserted into bed 60 via a sheet feeder (not shown), aligned using positioning means (not shown) and fixed by suckers 62. Elements 62 are thereafter cut out of the sheet.

Bed 60 is now passed on from position A via transport means 61 to one or more following processing units B to F. The vacuum is maintained during transport of the punch bed and during the following processing steps at least until the individual elements and carrier material 53 have been aligned and bonded together sufficiently. Depending on the production sequence, the punch bed runs through various units. The method steps shown in FIG. 7 comprise:

a) a disposal unit B for removing waste 51,
b) an applying unit C in which e.g. a bonding agent is applied,
c) a further sheet feeder D for placing a carrier sheet 53 on punched elements 52 in exact register,
d) a bonding unit E in which elements 52 are attached to carrier 53 e.g. by thermofixing, and
e) a pile delivery means F for removing compound sheet 54 after the vacuum has been switched off and suction channels 62 ventilated.

A third embodiment of variation I is shown in FIG. 8. In this example, web material 160 is processed in a flat bed punch. The punch bed is bipartite in this case, comprising a perforated back pressure plate 151 and a bonding table 152 disposed therebelow. Punching material 154 is fed to back pressure plate 151 and positioned by being moved to stops 153 in the longitudinal and transverse directions. Carrier web 155 is introduced into gap 156 between back pressure plate 151 and bonding table 152. The gap is preferably only slightly higher than the thickness of the two webs. A register control means (not shown) ensures that carrier web 155 is in exact register with punching material 154. For punching and fixing, a die 161 moves toward the back pressure plate, punches out an element 158 and pushes it through opening 159 onto carrier material 155, the element being guided by the edges of opening 159. Element 158 can be bonded with carrier 155 in the ways already described, being preferably thermofixed fixed by a heatable die. After die 161 is withdrawn, the two webs are each transported further by the length of one copy. Separate transport means for the two webs make it possible to transport punching material and carrier web 155 with different feed in accordance with the particular register.

Figure 10:
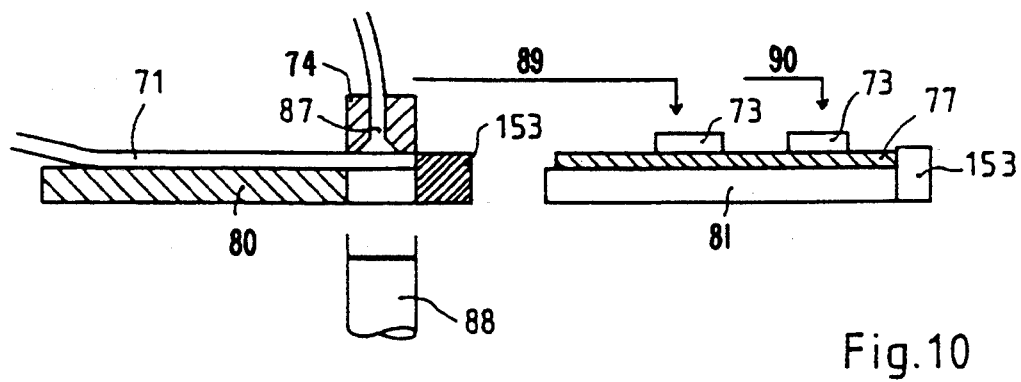
FIG. 10 shows a schematic view of an apparatus for transferring the punching material between two processing machines.
Figure 9:
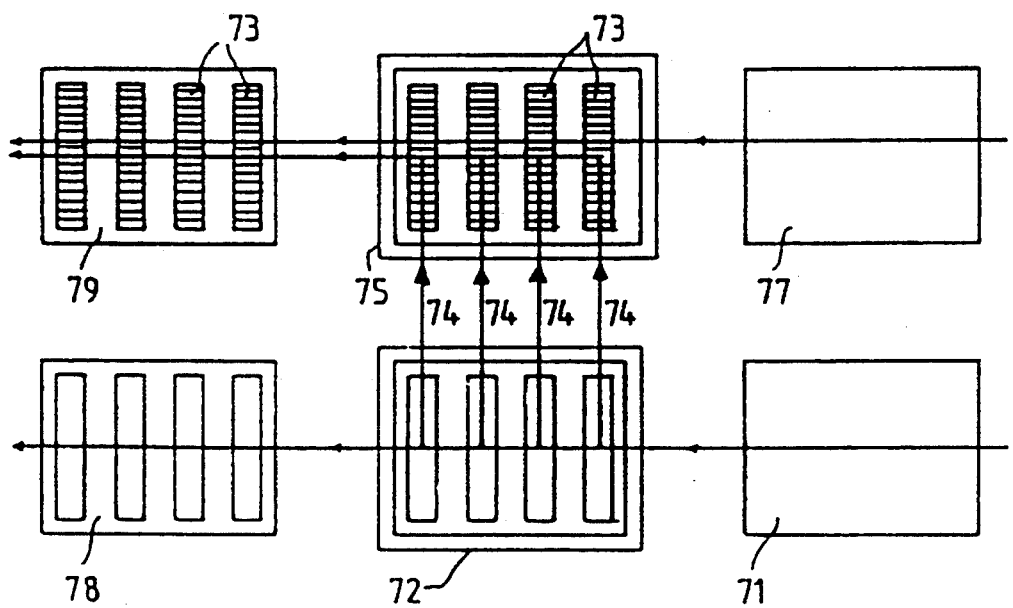
FIG. 9 shows a schematic view of the process sequence using a transfer machine.

Embodiments of variation II are shown in FIGS. 9 and 10.

In a first embodiment, the corresponding process sequence is shown in FIG. 9, using two working tables 72 and 75. Table 72 is designed as a punch bed and located in a punching device. Table 75 serves as a bonding table for bonding elements 78 with the carrier. Elements 78 are transferred from the punching table to the bonding table using gripping means. It is particularly advantageous to have the gripping performed by a manipulator, a robot or a similar computer-assisted machine which performs the transfer in stereotypical and precise fashion.

At the beginning of the process, sheet feeders are used to position punching material 71 on table 72, and carrier material 77 on table 75. Elements 73 are then punched. According to the invention, the punching is performed in such a way that elements 73 remain in their previous arrangement. A gripper (not shown) thereafter grips elements 72 and transfers them in accordance with arrows 74 in the proper position to the carrier material located in table 75. Individual elements 73 are bonded here with carrier material 77 by known methods. After compound sheet is removed to a pile and waste 78 disposed of, the means are free again for the next process cycle.

A second embodiment of variation II is shown schematically in FIG. 10. In this example as well, punching and bonding are performed in two separate units. The punch bed is designed in such a way, however, that it can be used simultaneously as a gripping head and a support for the die. Punching material 71, which may be supplied as a web or a sheet, is aligned on punch bed 80 by positioning means. Suction openings 87 serve to fix punching material 71. After punching with die 88, gripper 74 designed as a back pressure plate is supplied together with fixed individual element 73 to the second processing unit, where the element is deposited on second table 81 in a predetermined position by releasing the vacuum fixing. The gripper is finally fed to the punching machine again. Electronically controlled or computer-assisted manipulators make it possible deposit successively punched elements 73 on the second table in different, precalculated positions. It is therefore unnecessary to make the copy pattern of punching material 71 identical to carrier 77; it may instead be printed in a close arrangement that minimizes waste. Different paths 89 and 90 which the gripper covers when depositing the elements are illustrated in FIG. 10. Elements 78 can be deposited directly on the table or on an inserted and aligned carrier sheet 77. To bond the elements with the carrier, one can use various already-mentioned techniques here as well.

By appropriately designing the tools and grippers, one can also modify the method in such a way that groups of elements can be processed simultaneously instead or individual elements.

Figure 11:
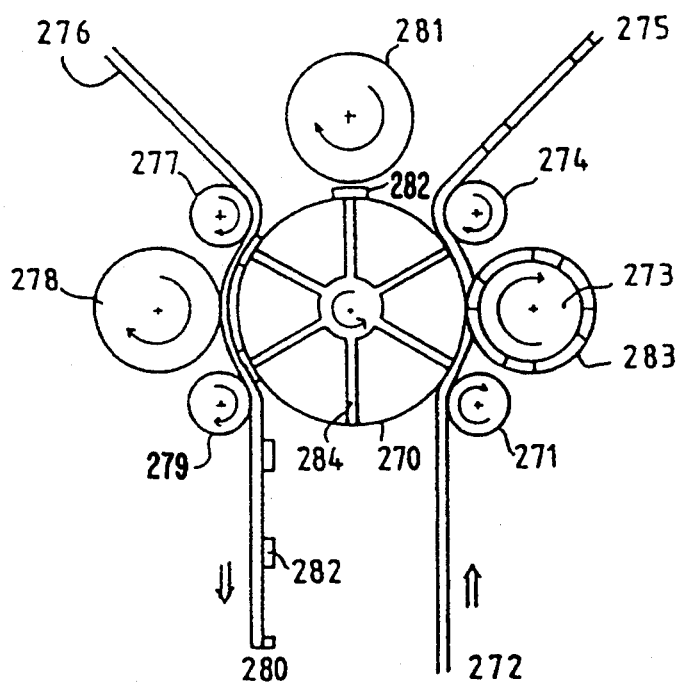
FIG. 11 shows a schematic view of an apparatus for processing web material on a roller type punching machine.

An embodiment of variation III is shown in FIG. 11 by a diagram of the positioned application of elements to a carrier material using an extended roller type punching machine. The central unit is back pressure roller 270 designed as a punch bed and fixing bed, about which the various processing units are grouped. In accordance with the method steps these units are, for example, a sheet feeder 271 for web material 272, a punching device 273, a waste disposal means 274, a further sheet feeder 277 for carrier web 276, a sheet bonder 278 for bonding the punching material with the carrier, and a web delivery means 279 for removing compound web 280.

Carrier sheet 276 and punching material 272 are provided with an identical arrangement of copies. The punching pattern is preferably such that the waste forms an interconnected grid sheet 275. The punching material is fed to the punching device in proper register via a sheet feeder 271. A rotating punch roller 273 with elevated blades 283 continuously, cuts elements 282 our of the punching material. At the same time as the cut, the elements are fixed on back pressure roller 270. The later is provided for this purpose with a vacuum suction means. Suction channels 284 end on the surface area, being disposed in accordance with the pattern of copies on the punching material in such a way that solely the elements are sucked. Valves not shown between the channels and the suction pump which are synchronized with the rotation of the back pressure roller activate the fixing during punching.

After passing through the punching device, the elements fixed on back pressure roller 270 run toward the disposal unit. Here, waste 275 is removed in the form of a grid web using a web delivery means 274 and wound, for example, onto a disposal roller.

In the example shown, the elements now run toward a coating roller 281 which applies an adhesive to the exposed surface of elements 282.

The elements thereafter run into the sheet bonder. Here, carrier film 276 is placed in proper register on elements 282 via a second web feeder and, for example, pressed against a further roller 278 to solidify the adhesive bond. At the same time, the valve control ensures that the vacuum is switched off and suction channels 284 are ventilated. The compound web can now be removed from back pressure roller 270 by a web delivery means and fed to a further processing unit or a winding means.

Figure 12:
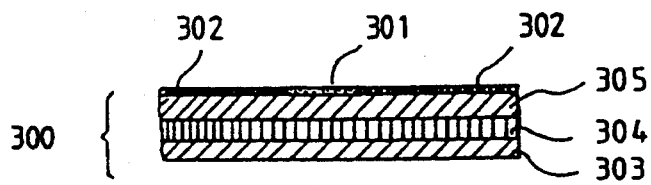
FIG. 12 shows a sectional view of a laminated card with an edgeless element and a thickness compensating film.

FIG. 12 shows a sectional view of a laminated identity card 300 having a signature stripe 301 embedded in a recess of a compensating film 302. The card itself has a conventional layer structure, comprising films 303, 304, 305. The films are usually made of thermoplastic synthetic materials which can be welded together by the action of temperature and pressure. Compensating film 302 and signature stripe 301 have approximately the same thickness, so that a smooth surface without steps is obtained after lamination, provided the recess and the element are formfitting.

Figure 13:
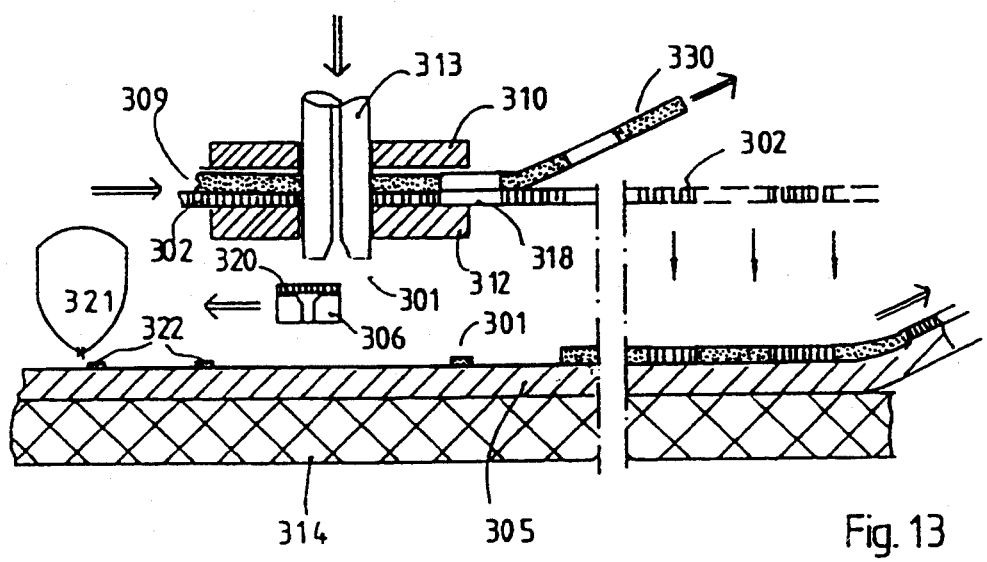
FIG. 13 shows method steps and apparatus for punching and positioning the compensating film in exact register with the elements.

FIG. 13 shows the production steps for punching compensating film 302 and element 301 in formfitting fashion, and for positioning the two materials in exact register on carrier 305. The transport movements of the material and units in the various working steps are shown symbolically by double arrows. The method, that can be performed on different types of punching machines, is set forth in the following by way of example on a flat bed punch. The punch bed comprises a perforated back pressure plate 312. Die 313 has a fixing means for punched element 301 in the form of a vacuum sucker. Below back pressure plate 312 there is a working table 314 into which carrier 305 is inserted. The materials may be fed to the punch in a web or a sheet form, as desired. They are fed using rollers or sheet feeders (not shown) in such a way that compensating film 302 and sheet of elements 309 lie one above the other in punch bed 312. A cover plate 310 ensures a fixing of the punching material during the punching process.

In the first step, the elements and the compensating film are punched. Downwardly moving die 313 cuts through both inserted materials in one working step, cutting both element 301 and recess 318 out of compensating film 302. After punching, die 313 remains in a predetermined mid position between back pressure plate 312 and working table 314, as shown in the figure. Element 301 was fixed during the punching process by switching on the vacuum on the die. Punching 320 cut out of compensating film 302 may be detached from the die and removed using suitable means 306.

In the next step, element 301 is attached to carrier 305. In a preparatory step, the carrier has passed through a dosing unit 321 in which a bonding agent 322 is applied locally in register with the elements. The carrier is thereafter fed to the punching device as soon as the latter is positioned in working table 314. Die 313 moves into its lower end position, thereby placing element 301 on the carrier and attaching it.

The last step consists in bringing together carrier 305 and compensating grid 302. The die has returned to its starting position after the vacuum suction has been switched off, so that the punching material can be removed from the machine. To maintain the exact register, the punching material and the carrier are brought together on working table 314 in a transport system (not shown) with synchronous feed timing. During the feed, paper grid 330 is removed from the compensating grid by a gripper (not shown) and disposed of. Due to the synchronous feed, compensating film 302 and elements 301 are located on carrier 305 in working table 314 in exact register.

The formfit of the elements and the recesses is ensured by the common punching. The layer structure can be made permanent in further working steps, e.g. fixed with heated needles. The material thus produced can be stored as a semifinished product or immediately processed into a final product.

The apparatus shown in FIG. 13 may also be used to produce a semifinished product in which elements 301 are fixed in recesses in a sheet 302 which are punched with the elements. In a first step, elements 301 are bonded with an auxiliary carrier 305 with low bonding power. After sheet 302 punched with elements 301 in exact register has been placed on auxiliary carrier 305, the elements are fixed to sheet 302 by suitable methods, for example at the edges.

Due to the low bonding power between the elements and the auxiliary carrier, the semifinished product consisting of elements 301 and 302 can be detached from auxiliary carrier 305 and, for example, wound onto a roller for storage.

Figure 14:
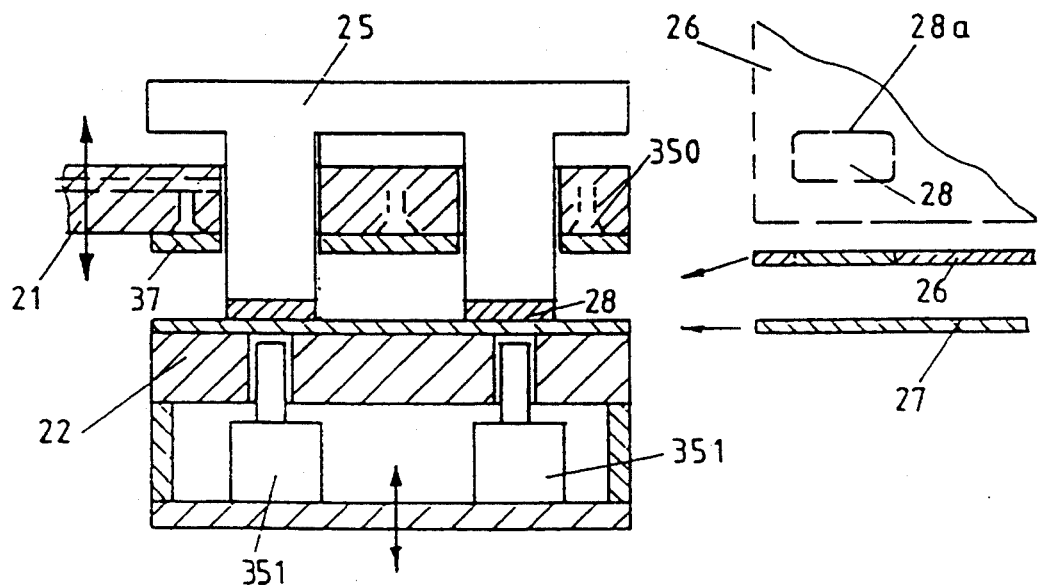
FIG. 14 shows a schematic view of an apparatus for processing prepunched sheet material.

FIG. 14 shows an embodiment of the invention in which sheet material with already prepunched elements is processed. Elements 28 are held in punching material or sheet 26 only by narrow bridges 28a. First, sheer 26 and carrier material 27 are conveyed onto table 22 and aligned thereon in exact register. Vertically movable table 22 is thereafter guided with sheets 26 and 27 located thereon against dies 25, whereby back pressure plate 21, which is vertically movable in this embodiment, initially also lies on sheet 26. In the subsequent step, back pressure plate 21 is raised while dies 25 remain in their position. Since the back pressure plate also raises sheet waste 37 with the aid of integrated suction means 350, bridges 28 are severed so that finally only elements 28 remain on the carrier material. The waste may be disposed of by vertically lowering back pressure plate 21 and table 22 after carrier material 22 has been removed.

Elements 28 may be connected with carrier 27 by an ultrasonic welding set 351 disposed on the side of carrier 27 opposite element 28. The frictional heat arising from the ultrasonic energy mainly in the boundary layer between the element and the carrier leads to a bonding of the elements. Such ultrasonic means may of course also be used advantageously in the other variations of the method.

FIGS. 15 to 18 show embodiments of the invention in which a signature stripe has been subsequently applied to a completed card laminate.

Figure 15:
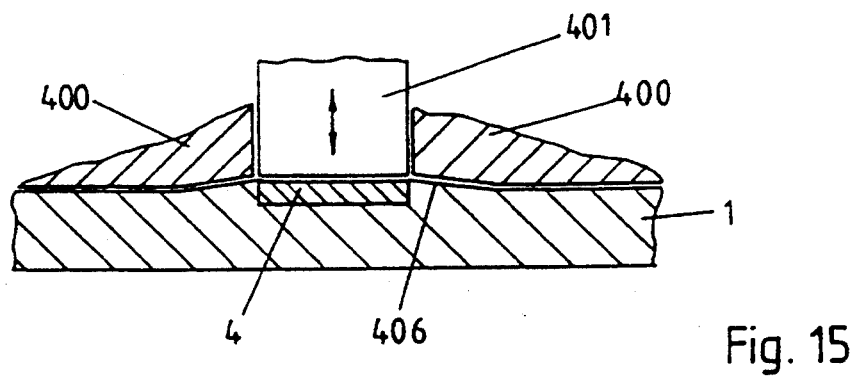
FIG. 15 shows an already laminated card with an embedded punched element.

In the embodiment of FIG. 15, signature stripe 4 is pressed into the softening surface of the card with the aid of an ultrasonic die 401, for example. In the environment of the die there are mold parts 400 which channel the card material displaced out of the area of the signature stripe so as to give rise to thickenings 406 in the edge area of signature stripe 4, thereby avoiding a jump in thickness between the surface of the stripe and that of the card.

Figure 16A:
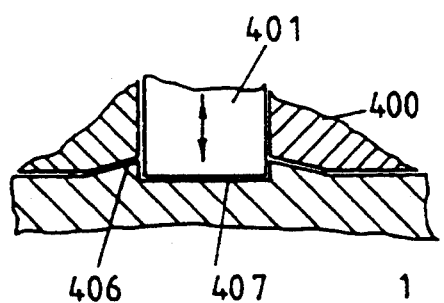
FIGS. 16a and 16b show an already laminated card before and after insertion of a punched element.
Figure 16B:
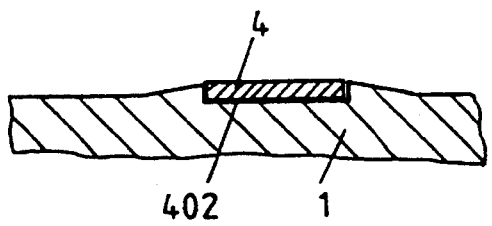

FIGS. 16a, 16b show an embodiment in which the card body is provided, for example, also with an ultrasonic die 401 and corresponding mold parts 400 with a depression 407, whereby elevations 406 of material again form in the edge area of the depression. In the depression a signature stripe is thereafter connected with card body 1 with the aid of an adhesive 402, as shown in FIG. 16b.

Figure 17A:
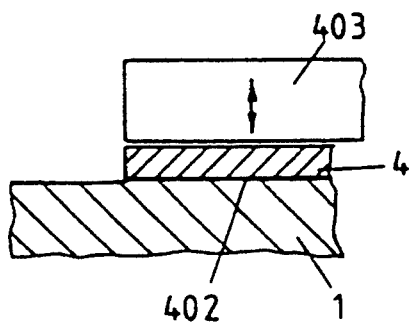
FIGS. 17a and 17b show an already laminated card with a punched element fixed thereon whose edges are lowered.
Figure 17B:
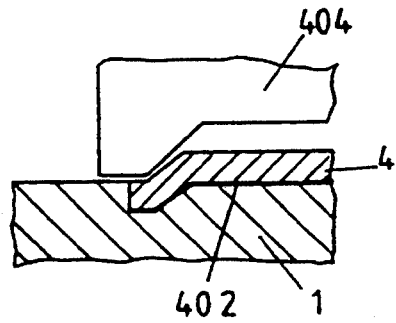

In the embodiment shown in FIGS. 17a and 17b, signature stripe 4 coated with a heat-seal adhesive 402 is first fixed on the surface of card body 1 using a heating die. As shown in FIG. 17b, the edge area of stripe 4 is then, in a further method step, pressed into the card material by a correspondingly shaped ultrasonic die 404. Since the amount of card material to be displaced is relatively low in this variation of the method, the mold parts shown in FIGS. 15 and 16 can be dispensed with.

Figure 18:
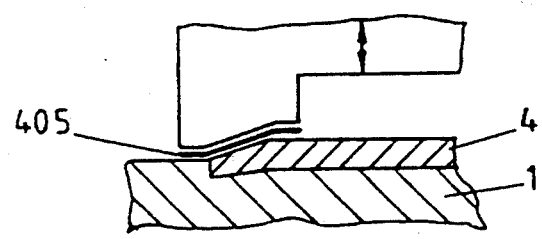
FIG. 18 shows an already laminated card having an additional element in the edge area of the punched element.

FIG. 18 finally shows an embodiment in which an additional cover element 405 is provided in the edge area of signature stripe 4. This element may be a transparent or printed film which is applied, for example, by the "embossing" method. This element makes it possible to tie the signature stripe into the general appearance of the card, which further increases the protection of the signature stripe and of the card itself against forgery. Such a security element may also be used in the card shown in FIG. 15 or 16b.

We claim:

1. An apparatus for applying a punched paper strip element in a desired position onto the surface of a plastic carrier material, comprising:
    a) a punching device including a movable punch bed;
    b) a feeding means for positioning multiple copies of the paper strip element onto the movable punch bed in exact register with said punch bed;

c) said punching device including means for fixing the position of said multiple copies of paper strip elements relative to the punch bed after punching; and d) means for bringing together punched multiple copies of the paper strip elements associated with the punch bed with the plastic carrier material.

2. The apparatus of claim 1, wherein the punching device comprises a rotatable punch bed and a cooperating rotatable die.

3. The apparatus of claim 1 wherein the means for position fixing comprises a vacuum suction means.

4. An apparatus for applying a flat punched paper strip element in a desired position onto the surface of a plastic carrier material, comprising a) a feeding means for positioning multiple copies of the paper strip element on the punch bed in exact register, b) means for fixing the position of the punched elements, and c) means for moving the punch bed to further processing units.

5. An apparatus for applying a flat punched paper strip element in a desired position to the surface of a plastic carrier material, comprising a) a first feeding means for positioning multiple copies of the paper strip element on a first punch bed in exact register, b) a second feeding means for positioning carrier material on a second punch bed in exact register, and c) a transfer means for gripping and transferring the punched elements to the carrier material on the second bed while retaining their position.

6. An apparatus for applying a flat punched paper strip element in a desired position to the surface of a plastic carrier material, comprising a) a feeding means for positioning the multiple copies of the paper strip element and carrier material on a table in exact register, the elements being prepunched on the sheet, b) a holding means for fixing the position of the elements on the carrier material, c) a withdrawing means for removing the waste from the carrier material.

* * * * *